United States Patent [19]

Back

[11] Patent Number: 5,454,705
[45] Date of Patent: Oct. 3, 1995

[54] SEMICONDUCTOR MOLD HAVING CAVITY BLOCKS WITH CAVITIES ON TOP AND BOTTOM SURFACES

[75] Inventor: Seung Dae Back, Choongchungbook, Rep. of Korea

[73] Assignee: Goldstar Electron Co., Ltd., Cheongju, Rep. of Korea

[21] Appl. No.: 993,424

[22] Filed: Dec. 21, 1992

[30] Foreign Application Priority Data

Dec. 20, 1991 [KR] Rep. of Korea ............ 23670/1991

[51] Int. Cl.$^6$ .................... B29C 45/10; B29C 45/14
[52] U.S. Cl. ............... 425/116; 264/272.17; 425/129.1; 425/183; 425/190; 425/544
[58] Field of Search .................... 425/116, 117, 425/129.1, 183, 186, 233, 408, 544, 185, 190; 264/272.17; 249/102, 155, 157, 162

[56] References Cited

U.S. PATENT DOCUMENTS

| 1,317,093 | 9/1919 | Minnick | 249/102 |
|---|---|---|---|
| 1,409,591 | 3/1922 | Schavoir | 249/102 |
| 2,663,905 | 12/1953 | Van Riper et al. | 425/116 |
| 3,871,611 | 3/1975 | Takata | 249/102 |
| 4,158,910 | 6/1979 | Hanas et al. | 425/183 |
| 4,345,965 | 8/1982 | Lindenmayer et al. | 425/185 |
| 4,374,080 | 2/1983 | Schroeder | 264/272.17 |
| 4,551,084 | 11/1985 | Lake | 425/185 |
| 4,793,785 | 12/1988 | Osada | 425/116 |
| 5,061,164 | 10/1991 | Sabado et al. | 425/183 |

*Primary Examiner*—Jay H. Woo
*Assistant Examiner*—Robert B. Davis
*Attorney, Agent, or Firm*—Scully, Scott, Murphy & Presser

[57] ABSTRACT

A metallic mold for molding semiconductor package including a pair of cavity blocks capable of molding two types of semi conductor packages in order to reduce manufacturing cost. The metallic mold includes an upper cavity block to be inserted in its normal state and its turned over state in an upper chase block mounted on a lower surface of a top mold base of an upper mold die which is formed at its upper surface with one type of cavities and at its lower surface with another type of cavities, and a lower cavity block to be inserted in its normal state and its turned over state in a lower chase bock mounted on a bottom mold base of a lower mold base which is formed at its upper surface with cavities mating with the another type of cavities of the upper cavity block and at its lower surface with cavities mating with the one type of cavities of the upper cavity block.

1 Claim, 2 Drawing Sheets

SEMICONDUCTOR MOLD HAVING CAVITY BLOCKS WITH CAVITIES ON TOP AND BOTTOM SURFACES

BACKGROUND OF THE INVENTION

1. Field of the Invention

The present invention relates to a metallic mold for molding semiconductor package and, more particularly, pertains to a metallic mold for molding semiconductor package which includes an upper cavity block having two types of series of cavities at, respectively, upper and lower surfaces thereof, and a lower cavity block also possessing such two types of series of cavities at, respectively, the upper and lower surfaces thereof. Each of the upper cavities of the upper cavity block is adapted to mate with each of the lower cavities of the lower cavity block, and each of the lower cavities of the upper cavity block is adapted to mate with each of the upper cavities of the lower cavity block, so as to enable two types of molded products to be manufactured by employing only the pair of cavity blocks, thereby increasing the degree of productivity in the manufacture of semiconductor packages.

2. Description of the Prior Art

In general, a process for manufacturing semiconductor packages, subsequent to semiconductor chip having been attached to the inner leads of a lead frame such that bonding pads of the semiconductor chip are electrically connected to the respective inner leads of the lead frame, provides for the step that the semiconductor chip and the inner leads which have been connected to each other are encapsulated by a molding compound in order to form a specifically configured semiconductor package.

Referring to FIG. 1, there is shown a conventional molding die which is used to mold semiconductor packages as described herein above. As shown in the drawing, the molding die is generally divided into an upper mold die "T" and a lower mold die "B".

The upper mold die "T" includes a top mold base 10 and a top chase block 11 which is mounted on a lower surface of the top mold base 10 by means of screws. A top ejector plate 17 and a top drive plate 18 are mounted on the top mold base 10. A top return pin 19 is fixed to the top ejector plate 17 and protrudes downwardly. A support pin 19a is fixed to the top drive plate 18 in order to support the top return pin 19. Moreover, the top return pin 19 is inserted through holes in the top mold base 10 and the top chase block 11 so as to enable the top ejector plate 17 and the top drive plate 18 to be moved either upwardly and downwardly.

The top chase block 11 has a top center block 12 located in the center of its interior. The top center block 12 is closely fixed to a lower surface of the top mold base 10 by means a suitable locking block (not shown). The top center block 12, which is fixed in the top chase block 11, is formed at its lower surface with runners 12a and gates 12b adapted to be in communication with the runners 12a such that a resin in a gel state can be introduced into the runners 12a and the gates 12b through a pot (not shown).

Upper cavity blocks 13, at a lower surface of which there are formed a plurality of upper cavities 13a, are mounted at both sides of the center block 12 in the chase block 11. An upper pillar supporting plate 15 having a plurality of holes is mounted on each of the upper cavity blocks 13. A plurality of upper pillars 14, each of which corresponds to and is inserted into each of the holes of the upper pillar supporting plate 15, are interposed between the upper pillar supporting plate 15 and the top mold base 10, so that the plurality of pillars 14 support the upper cavity blocks 13 through the pressure of the top mold base 10. A locking block 16 is interposed between the outer side of each of the cavity blocks 13 and inner surface of the top mold base 10.

On the other hand, the lower mold die "B" includes a bottom mold base 20 and a bottom chase block 21 which is mounted on an upper surface of the bottom mold base 20 by means of fastening screws. A bottom ejector plate 27 and a bottom drive plate 28 are mounted on the bottom mold base 20. A bottom return pin 29 is fixed to the bottom ejector plate 27, and protrudes upwardly. A support pin 29a is fixed to the bottom drive plate 28 for the purpose of supporting the bottom return pin 29. Additionally, the bottom return pin 29 is inserted through holes in the bottom mold base 20 and the bottom chase block 21 so that the bottom ejector plate 27 and the bottom drive plate 28 can be moved either upwardly or downwardly. A clamping block 29b is located under the bottom drive plate 28.

The bottom chase block 21 has a bottom center block 22 located in center of its interior. The bottom center block 22 is closely fixed to an upper surface of the bottom mold base 20 by means of a locking block (not shown).

The bottom center block 22 which is fixed in the bottom chase block 21 is formed with runners 22a at both sides of upper surface thereof which are in communication with the runners 12a of the top center block 12.

Lower cavity blocks 23, at an upper surface of which there is formed a plurality of lower cavities 23a and gates 23b which are each in communication with each of the lower cavities 23a, are mounted at both sides of the bottom center block 22. Between the outer side of each of the cavity blocks 23 and the inner surface of the bottom mold base 20 there is interposed a locking block 26 in order to provide a fastening for the lower cavity block 23.

A lower pillar supporting plate 25 having a plurality of holes is mounted on a lower surface of each of the upper cavity blocks 23. A plurality of lower pillars 24, each of which corresponds to and is inserted in each of the holes of the lower pillar supporting plate 25, are interposed between the lower pillar supporting plate 25 and the bottom mold base 20 such that the plurality of pillars 24 support the lower cavity block 23 through pressure of the bottom mold base 20.

Accordingly, the conventional metallic mold for molding semiconductor package comprises the upper cavity block 13 having a plurality of upper cavities 13a at its lower surface and the lower cavity block 23 having a plurality of lower cavities 23a at its upper surface, in a manner whereby each of the upper cavities 13a of the upper cavity block 13 mates with each of the lower cavities 23a of the lower cavity block 23 to form a pair of molds for molding the shapes of semiconductor packages.

In this description of the conventional mold, although a plurality of other components besides the components shown in the drawing are associated with the upper mold die "T" and the lower mold die "B" so as to inject molding resin in a gel state into the cavities 23a and 13a through the runners 12a of the top center block 12, those other components are not illustrated in the drawing because the invention only concerns itself with the cavity blocks.

The operation of the mold die for semiconductor packages possessing the above-mentioned prior art mold for molding semiconductor packages is now described as follows:

First, after semiconductor chips which are wire-bonded to respective lead frames, are placed on the lower cavity blocks 23, the upper molding die "T" and the lower molding die "B" are clamped to each other such that each of the upper cavities 13a of the upper cavity blocks 13 faces each of the lower cavities 23a of the lower cavity block 23 which corresponds to the upper cavity 13a. Thereafter, as a plunger (not shown) is inserted downwardly into the upper molding die "T", molding resin is supplied to the pot of the upper molding die "T" and injected into the runners 12a and the gates 12b of the top center blocks 12. Thereafter, the molding resin is injected into the upper and lower cavities 13a and 23a through the gates 22a of the bottom center block 22 and the gates 23b of the lower cavity blocks 23.

Consequently, since the series of upper cavities 13a of the upper cavity block 13 and the series of lower cavities 23a of the lower cavity block 23 constitute only one type of molding shape, the conventional cavity blocks can mold only one type of molded products.

On the other hand, in order to manufacture another type of semiconductor packages, after the locking blocks are separated from the fastened together upper and lower cavity blocks 13 and 23, the upper and lower cavity blocks 13 and 23 are simultaneously pulled out of the upper and lower chase blocks 11 and 21. Thereafter, separate upper and lower blocks which are formed with another shape of cavities are inserted into the upper and lower chase blocks 11 and 21. The mold die is then operated in the above-mentioned manner so as to mold another shape of semiconductor packages.

As described above, the cavity blocks have been known as the most important components in a molding die for molding semiconductor package. In addition, since each of the cavity blocks must be formed with several tens or hundreds of cavities and runners for guiding resin to the cavities by super-precise electro-discharge machining, the cavity blocks are the most expensive components.

However, since the above-mentioned conventional metallic mold for molding semiconductor packages possesses one type of cavities capable of molding only one shape of semiconductor packages, it is necessary to prepare separate and expensive cavity blocks having another shape of cavities when it is intended to manufacture another shape of semiconductor packages, thereby increasing the costs of manufacture. Furthermore, since there is required a lengthy period of time for installing separate upper and lower cavity blocks in a molding die, the productivity is lowered for molding the products.

SUMMARY OF THE INVENTION

The present invention is accordingly intended to obviate the above-mentioned problems which are encountered in the prior art, and an object of the invention is to provide a metallic mold for molding semiconductor packages which possesses two types of cavities in order to be able to mold two shapes of semiconductor packages so as to eliminate the necessity for preparing two pairs of metallic molds, thereby reducing manufacturing costs.

Another object of the present invention is to reduce the period of time which is required for exchanging one type of metallic mold for another metallic mold, so as to thereby improve upon productivity.

In accordance with the present invention, the foregoing objects are accomplished by providing a metallic mold for molding semiconductor packages comprising: an upper cavity block which is adapted to be inserted in its normal orientation and in an inverted state into an upper chase block which is mounted on a lower surface of a top mold base of an upper mold die, the latter of which has formed at its upper surface one type of cavities and at its lower surface another type of cavities. Also, included is a lower cavity block which is adapted to be inserted in its normal orientation and in an inverted state into a lower chase block which is mounted on a bottom mold base of a lower mold base, the later of which is formed at its upper surface with cavities mating with the other type of cavities of the upper cavity block and at its lower surface with cavities mating with the first type of cavities of the upper cavity block. The lower cavity block is provided at its upper and lower surfaces with gates for guiding a flow of resin to the cavities of the lower cavity block.

Additionally, a cavity protecting plate is interposed between the upper cavity block and upper pillars and a cavity protecting plate is interposed between the lower cavity block and lower pillars in order to prevent the upper and lower surfaces of the upper and lower cavity blocks from being damaged.

In the above-mentioned metallic mold for molding semiconductor packages according to the present invention, the one type of cavities formed at the upper surface of the upper cavity block mate with the cavities formed at the lower surface of the lower cavity block so as to mold semiconductor packages corresponding to the one type of cavities. On the other hand, in order to mold other shape of semiconductor packages corresponding to the other type of cavities, the upper and lower cavity blocks are pulled out of the mold die and then turned over. Subsequently, the upper and lower cavity blocks are again inserted into the mold die so that the other type of cavities formed at the lower surface of the upper cavity block mate with the cavities formed at the upper surface of the lower cavity block to mold the other shape of semiconductor packages.

BRIEF DESCRIPTION OF THE DRAWINGS

These and other objects, features and advantages of the invention will now become more readily apparent from the following detailed description and accompanying drawings, in which.

DETAILED DESCRIPTION OF PREFERRED EMBODIMENTS OF THE INVENTION

Figure 1:
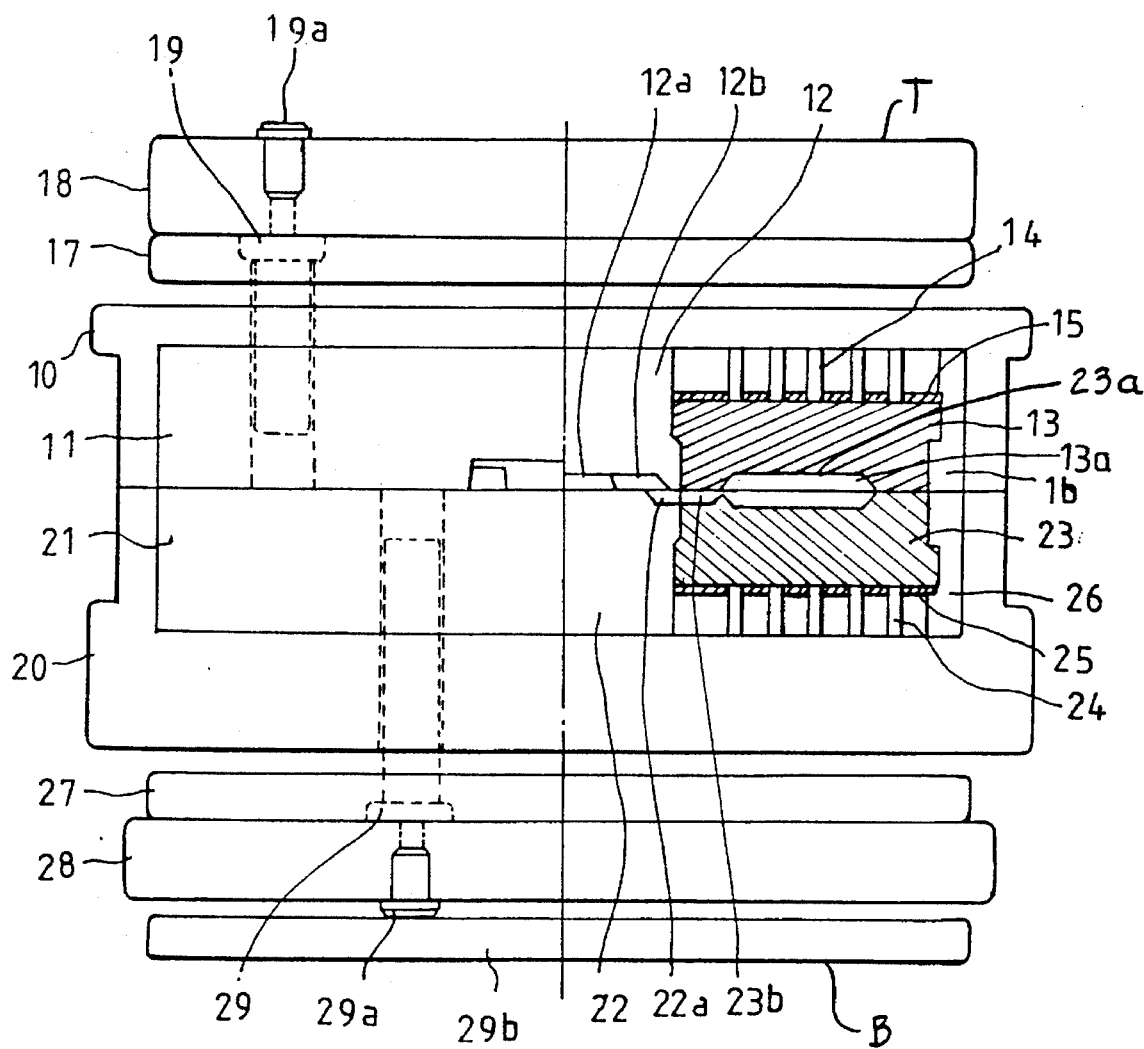
FIG. 1 illustrates a sectional view of a molding die possessing a prior art metallic mold for molding semiconductor packages.
Figure 2:
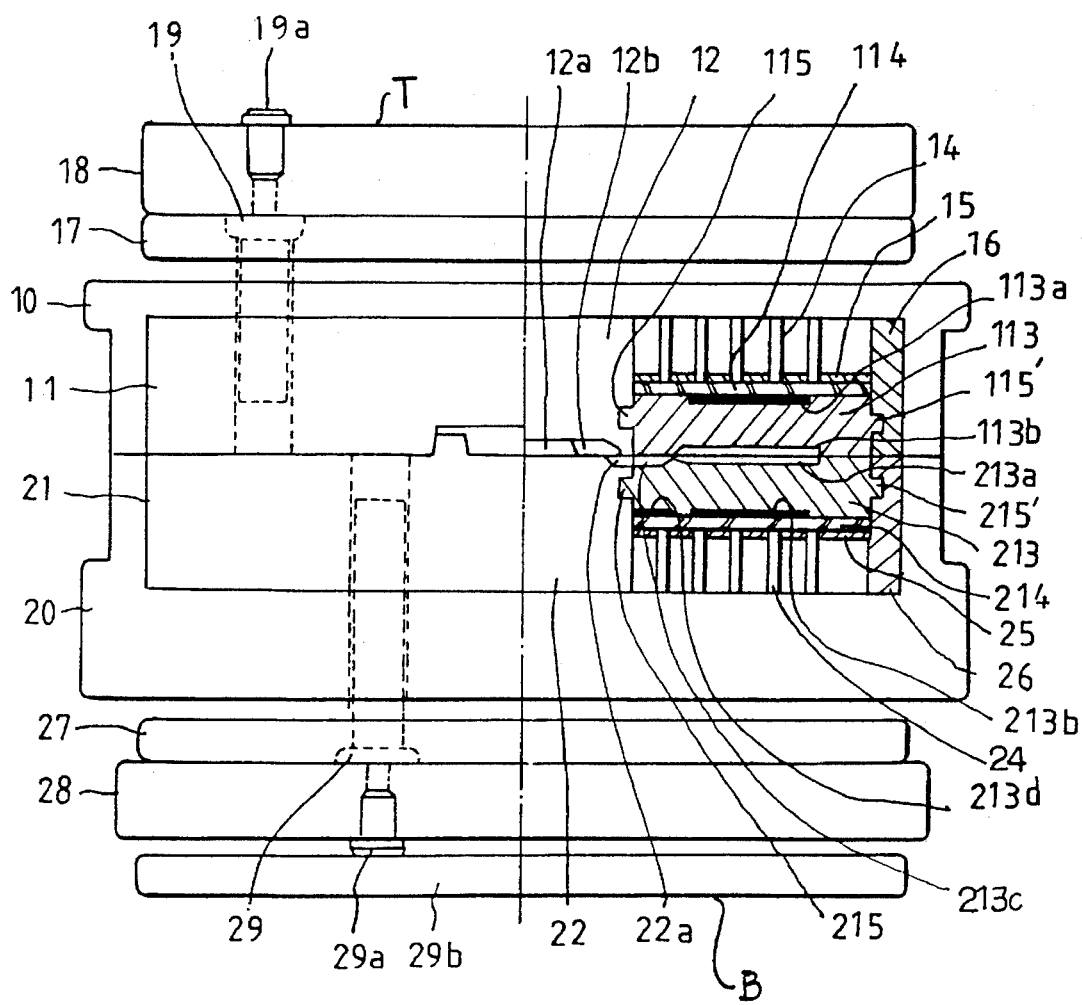
FIG. 2 illustrates a sectional view of a molding die possessing a mold for molding semiconductor package according to the present invention.

A metallic mold for molding semiconductor packages according to the present invention is now described by referring to FIG. 2. Referring to FIG. 2, there is shown a molding die having a mold for molding semiconductor packages according to the present invention. As shown in the drawing, the molding die is generally divided into an upper mold die "T" and a lower mold die "B". The upper mold die "T" includes a top mold base 10 and a top chase block 11 mounted on a lower surface of the top mold base 10 by means of screws. A top ejector plate 17 and a top drive plate 18 are mounted on the top mold base 10. A top return pin 19 is fixed to the top ejector plate 17 and protrudes downwardly. A support pin 19a is fixed to the top drive plate 18 in order to support the top return pin 19. Additionally, the top return pin 19 is inserted through holes in the top mold base 10 and the top chase block 11 so that the top ejector plate 17 and the top drive plate 18 can be moved upwardly and downwardly.

The top chase block 11 has a top center block 12 located in the center of its interior. The top center block 12 is tightly fixed to a lower surface of the top mold base 10 by means of a locking block (not shown). The top center block 12, which is fixed in the top chase block 11, is formed with runners 12a and gates 12b which are in communication with the runners 12a so that resin in a gel state can be introduced into the runners 12a and the gates 12b through a pot (not shown).

Two cavity blocks 113, each of which is formed with one type of cavities 113a at its upper surface and with another type of cavities 113b at its lower surface, are mounted at both sides of the top center block 12. A cavity protecting plate 114 for protecting the upper and lower cavities 113a and 113b is mounted on each of the cavity blocks 113. An upper pillar supporting plate 15 having a plurality of holes therein is mounted on each of the cavity protecting plates 114. A plurality of upper pillars 14, each of which corresponds with and is inserted into each of the holes of the upper pillar supporting plate 15, are interposed between the cavity protecting plate 114 and the top mold base 10 so that the plurality of pillars 14 support the upper cavity blocks 13 via the cavity protecting plate 114 by the pressure of the top mold base 10. Interposed between the outer side of each of the cavity blocks 13 and the inner surface of the top mold base 10 is a locking block 16.

Each of the upper cavity blocks 113 is provided with a pair of guide rails 115 and 115' at both sides thereof, and the center blocks 12 and the locking blocks 16 are formed with the sides thereof correlated with the guide rails guide grooves for respectively guiding the guide rails 115 and 115'. Therefore, the upper cavity blocks 113 can be easily inserted into and pulled out of position from between the center blocks 12 and the locking blocks 16.

On the other hand, the lower mold die "B" includes a bottom mold base 20 and a bottom chase block 21 which is mounted on an upper surface of the bottom mold base 20 by means of fastening screws. A bottom ejector plate 27 and a bottom drive plate 28 are mounted on the bottom mold base 20. A bottom return pin 29 is fixed to the bottom ejector plate 27 and protrudes upwardly. A support pin 29a is fixed to the bottom drive plate 28 in order to support the bottom return pin 29. Also, the bottom return pin 29 is inserted through holes of the bottom mold base 20 and the bottom chase block 21 so that the bottom ejector plate 27 and the bottom drive plate 28 can be moved upwardly and downwardly. A clamping block 29b is located beneath the bottom drive plate 28.

The bottom chase block 21 has a bottom center block 22 located in the center of its interior. The bottom center block 22 is tightly fixed to an upper surface of the bottom mold base 20 by means of a locking block (not shown).

The bottom center block 22 is formed at both sides of the upper surface thereof with gates 22a, each gate being in communication with respectively each of the gates 12b of the top center block 12. A pair of lower cavity blocks 213 are mounted at both sides of the bottom center block 22. Each of the lower cavity blocks 213 is provided at its upper surface with cavities 213a, each mating with respectively each of the cavities 113b of the upper cavity block 113; and at its lower surface with cavities 213b each mating with respectively each of the cavities 113a of the upper cavity block 113. In addition, each of the lower cavity blocks 213 has its upper surfaces formed with gates 213c for connecting the gates 22a to the cavities 213b. Between the outer side of each of the lower cavity blocks 213 and the inner surface of the bottom mold base 20 there is interposed a locking block 26 for fastening of the lower cavity block 213.

A lower pillar supporting plate 25 having a plurality of holes is mounted on a lower surface of each of the upper cavity blocks 23. A plurality of lower pillars 24, each of which corresponds to and is inserted into each of the holes of the lower pillar supporting plate 25, are interposed between the lower pillar supporting plate 25 and the bottom mold base 20 so that the plurality of pillars 24 support the lower cavity block 23 by the pressure of the bottom mold base 20.

A cavity protecting plate 214 for protecting the upper and lower cavities 213a and 213b is mounted on a lower surface of each of the lower cavity blocks 213. A lower pillar supporting plate 25 having a plurality of holes is mounted on each of the cavity protecting plates 214. A plurality of lower pillars 24, each of which corresponds to and is inserted in each of the holes of the lower pillar supporting plate 25, are interposed between the cavity protecting plate 214 and the bottom mold base 20, so that the plurality of lower pillars 24 support the lower cavity blocks 213 via the cavity protecting plate 214 by means of the pressure of the bottom mold base 20.

Also, each of the lower cavity blocks 213 is provided with a pair of guide rails 215 and 215' at both sides thereof, and the center blocks 22 and the locking blocks 26 are formed at their sides, in conformance with the guide rails, with guide grooves for respectively guiding the guide rails 215 and 215'. As a result, the lower cavity blocks 213 can be easily inserted between the center blocks 22 and the locking blocks 26 and pulled out.

As described above, since the mold for molding semiconductor packages according to the invention comprises the upper cavity block 113 which has one type of cavities 113a at it supper surface and another type of cavities 113b at its lower surface, and the lower cavity block 213 which has cavities 213a each mating with respectively each of the cavities 113b of the upper cavity block 113 at its upper surface, and cavities 213b each mating with respectively each of the cavities 113a of the upper cavity block 113 at its lower surface, each of the cavities 113b of the upper cavity block 113 mates with each of the cavities 213a of the lower cavity block 213 to provide one type of molding cavity and each of the cavities 113a of the upper cavity block 113 mates with each of the cavities 213b to provide another type of molding cavity.

Operation of the molding die for semiconductor packages possessing the above-mentioned mold for molding semiconductor packages according to the invention is now described as follows:

First, after semiconductor chips, which have each been respectively wire bonded to lead frames, are placed on the lower cavity blocks 23, and the upper molding die "T" and the lower molding die "B" are clamped to each other such that each of the upper cavities 113a of the upper cavity blocks 113 faces each of the lower cavities 213b of the lower cavity block 213 which corresponds to the upper cavity 113a. Thereafter, as a plunger (not shown) is inserted downwardly into the upper molding die "T", molding resin is supplied to the pot of the upper molding die "T" and injected into the runners 12a and the gates 12b of the top center blocks 12. The molding resin is then injected into the upper and lower cavities 113a and 213b through the gates 22a of the bottom center block 22 and the gates 213d of the lower cavity blocks 213. As a result, there is molded one shape of semiconductor packages corresponding to the upper and lower cavities 113a and 213b.

Alternatively, in order to mold another type of semiconductor packages, only the locking block which locks the upper and lower cavity blocks 113 and 213 at the front side of the cavity blocks, is dislocated from the upper and lower cavity blocks 113 and 213, and thereafter the upper and lower cavity blocks 113 and 213 are simultaneously pulled out forwardly. Subsequently, the upper and lower cavity blocks 113 and 213 are turned over or inverted, and then again inserted in place of the molding die so that the opposite cavities 113b of the upper cavity block 113 mate with the opposite cavities 213a of the lower cavity block 213.

At this time, when the upper and lower cavity blocks 113 and 213 are pulled out and then inserted between the top and bottom center blocks 12 and 22 and the locking blocks 16 and 26, the guide rails 115, 115' and 215, 215' of the upper and lower cavity blocks 113 and 213 are guided along the guide grooves of the top and bottom center blocks 12 and 22 and the locking blocks 16 and 26, whereby the upper and lower cavity blocks 113 and 213 can be easily pulled out and also inserted.

As becomes apparent from the above description, a metallic mold for molding semiconductor packages according to the present invention comprises an upper cavity block which is formed with one type of cavities at its upper surface and with another type of cavities at its lower surface, and a lower cavity block which is formed at its upper surface with cavities corresponding to the cavities formed at the lower surface of the upper cavity block and at its lower surface with cavities corresponding to the cavities formed at the upper surface of the upper cavity block so that the upper and lower cavity blocks can be used in a normal station and also in an inverted state. Accordingly, the pair of cavity blocks can be employed to mold two types of semiconductor packages.

Also, since each of the upper and lower cavity blocks is provided at both sides thereof with guide rails adapted to be guided along guide grooves formed on a center block and a locking block in order to facilitate its pulling out and its insertion, the time which is required to exchange cavity blocks is shortened, thereby improving the productivity of the equipment.

Consequently, manufacturing costs are reduced as a consequence of a reduction in the number of molds (cavity blocks) which are required.

Modifications in construction will readily occur to those skilled in the art, and various different modifications and embodiments may be made without departing from the scope of the invention, concerning which the foregoing description and accompanying drawings is only exemplary. It is therefore intended that the foregoing description be regarded as illustrative rather than limiting in scope.

What is claimed is:

1. A metallic mold for molding semiconductor packages, comprising:

an upper cavity block having first and second surfaces wherein each said surface has a different type of mold cavity, said upper cavity block being insertable into an upper chase block mounted on a lower surface of a top mold base such that either surface selectively faces away from the top mold base;

a lower cavity block having first and second surfaces wherein each said surface has a different type of mold cavity, said lower cavity block being insertable into a lower chase block mounted on an upper surface of a bottom mold base such that either surface selectively faces away from the bottom mold base, said cavity on the first surface of said lower cavity block mating with one type of cavity on the first surface of said upper cavity block and the cavity on the second surface of said lower cavity block mating with the other type of cavity on the second surface of said upper cavity block, gates formed at the first and second surfaces of said lower cavity block for guiding a flow of a resin into the cavities of the lower cavity block;

said upper and lower cavity blocks further comprising guide rails which allow the cavity blocks to be guided in guide grooves formed in respective upper and lower center blocks and locking blocks to facilitate insertion into and withdrawal of said upper and lower cavity blocks from respectively said upper and lower chase blocks;

a first protective plate being positioned between said upper cavity block and upper pillars, and a second protective plate being positioned between said lower cavity block and lower pillars to prevent the first and second surfaces of each said upper and lower cavity blocks from being damaged during non-use thereof.

* * * * *